US012290033B2

(12) United States Patent
Rodd

(10) Patent No.: US 12,290,033 B2
(45) Date of Patent: May 6, 2025

(54) AQUAPONICS SYSTEM WITH A TERRACED GROW FLOOR

(71) Applicant: Underground Aquaponics, PBC, Deltona, FL (US)

(72) Inventor: Nickolas S. Rodd, Deltona, FL (US)

(73) Assignee: Underground Aquaponics PBC, Deltona, FL (US)

( * ) Notice: Subject to any disclaimer, the term of this patent is extended or adjusted under 35 U.S.C. 154(b) by 29 days.

(21) Appl. No.: 18/515,199

(22) Filed: Nov. 20, 2023

(65) Prior Publication Data

US 2024/0164351 A1 May 23, 2024

Related U.S. Application Data

(60) Provisional application No. 63/427,320, filed on Nov. 22, 2022.

(51) Int. Cl.
*A01G 31/02* (2006.01)
(52) U.S. Cl.
CPC .................................. *A01G 31/02* (2013.01)
(58) Field of Classification Search
CPC ...................................................... A01G 31/02
See application file for complete search history.

(56) References Cited

U.S. PATENT DOCUMENTS 5,636,472 A * 6/1997 Spira ...................... A01G 31/02
210/150
8,291,640 B2 * 10/2012 Kloas .................... A01K 63/00
47/62 R
8,839,742 B2 9/2014 Bodlovich et al.
8,919,040 B2 12/2014 Galvan
9,775,330 B1 * 10/2017 Chen ...................... A01K 63/00
(Continued)

FOREIGN PATENT DOCUMENTS

CN 107517843 A 12/2017
WO 2017210458 A1 12/2017

OTHER PUBLICATIONS

"Solar Powered Vertical Aquaponics System," offgridworld.com. https://offgridworld.com/solar-powered-vertical-aquaponics-system/ [Date accessed: Aug. 22, 2022].

(Continued)

*Primary Examiner* — Magdalena Topolski
*Assistant Examiner* — Edgar Reyes
(74) *Attorney, Agent, or Firm* — Bold IP PLLC; Binita Singh

(57) ABSTRACT

An aquaponics system includes an aquaculture production system comprising multiple fish tanks and a grow floor configured as a terraced floor for growing plants and/or crops. The multiple fish tanks are configured and organized to rear fish from fry to adults. The grow floor has a continuous downward spiral toward one or more clean water tanks. The one or more clean water tanks receive water from the grow floor and deliver the water to the aquaculture production system by a pipe. The water circulates through the multiple fish tanks and a pump returns water to the grow floor. The aquaculture production system and the grow floor are arranged within an enclosed building with the aquaculture production system arranged below the grow floor such that an open space is created between the aquaculture production system and the grow floor.

20 Claims, 8 Drawing Sheets

(56) References Cited

U.S. PATENT DOCUMENTS

| | | | | |
|---|---|---|---|---|
| 9,783,983 | B1* | 10/2017 | Fairbanks | E04C 2/54 |
| 9,974,243 | B2 | 5/2018 | Martin | |
| 10,506,770 | B2 | 12/2019 | Galonska et al. | |
| 10,660,283 | B2 | 5/2020 | Tidona | |
| 10,806,131 | B2 | 10/2020 | Hori | |
| 2009/0265986 | A1 | 10/2009 | Young | |
| 2009/0301399 | A1* | 12/2009 | Brown | A01K 63/065 |
| | | | | 47/17 |
| 2011/0067301 | A1* | 3/2011 | DeMitchell | A01G 31/02 |
| | | | | 251/356 |
| 2011/0296757 | A1* | 12/2011 | McGrath | A01K 63/04 |
| | | | | 47/62 R |
| 2013/0098303 | A1 | 4/2013 | Jones | |
| 2014/0041594 | A1 | 2/2014 | Plante | |
| 2014/0047767 | A1* | 2/2014 | Bodlovich | C02F 3/32 |
| | | | | 119/260 |
| 2016/0316645 | A1* | 11/2016 | Neufeld | A01G 31/02 |
| 2017/0049082 | A1* | 2/2017 | Kim | A01K 61/85 |
| 2018/0249649 | A1* | 9/2018 | Villamar | A01G 31/06 |
| 2018/0263194 | A1* | 9/2018 | Pilebro | H02S 20/23 |
| 2018/0295800 | A1 | 10/2018 | Kiernan | |
| 2019/0039931 | A1* | 2/2019 | Major | C02F 3/2866 |
| 2019/0200552 | A1* | 7/2019 | Gamberini | E02D 29/06 |
| 2019/0230879 | A1 | 8/2019 | Higgins | |
| 2019/0343091 | A1* | 11/2019 | Weiner | A01K 63/04 |
| 2021/0219502 | A1* | 7/2021 | Schulte | E06B 9/522 |

OTHER PUBLICATIONS

"Tour Our Spiral Aquaponics System at the Solar Living Center," youtube.com. https://www.youtube.com/watch?v=1WW6dy0JIyY [Date accessed: Aug. 22, 2022].

* cited by examiner

AQUAPONICS SYSTEM WITH A TERRACED GROW FLOOR

CROSS REFERENCE TO RELATED APPLICATIONS

This reference is a non-provisional application which claims priority to U.S. Provisional Application No. 63/427,320 filed on Nov. 22, 2022, which is incorporated by reference in its entirety.

FIELD OF DISCLOSURE

The present invention relates to aquaponics systems utilizing terraced and spiral grow beds.

BACKGROUND

Aquaponics is a combination of aquaculture and hydroponics. Aquaculture is essentially fish farming and hydroponics is growing plants in nutrient rich solution. Thus, aquaponics involves the growing of plants and raising fish in a symbiotic relationship. In aquaponics, plants are grown in a grow bed and fish are placed in the fish tank. The fish tank's water containing fish waste is fed to the grow bed where billions of naturally occurring beneficial bacteria break the ammonia down into nitrites and nitrates. Plants absorb these nitrates and other nutrients to help them grow. In return, the plants clean and filter the water. The clean and oxygenated water then recirculates back to the fish tank where the cycle will begin again.

There are many advantages to an aquaponics system over some other systems. With an aquaponics system, food can be grown all year round by regulating the growing needs or using greenhouses. The water usage is much lower in an aquaponics system, as it uses approximately 90% less water than conventional farming. This is possible because the water used is recycled as it is circulated through the system, so it is rarely changed or discarded. As the system does not use soil, there are no weeds to battle, and more time can be spent farming. Also, plants grow faster in an aquaponics system because the plants have constant access to nutrient-rich water. An aquaponics system does not require extensive land areas and thus can provide more food security. With Aquaponics, the food can be grown without harmful chemicals or fertilizers.

With all these advantages, aquaponics is drawing attention and is being hailed by some as the future of farming. There are several aquaponics grow farms, small and commercial, that have propagated for cultivating plants and crops. Accordingly, there is always a need to improve such a system so that cultivation of plants and rearing of fish can be enhanced and any existing issues can be addressed and improved.

SUMMARY

The disclosed system is unique when compared with other known aquaponics systems and solutions because it provides a structurally different system which is self-sufficient in an external companion support structure. The disclosed device is unique because it lowers manufacturing complexity, lowers manufacturing costs, increases manufacturing scalability, reduces time to market, redistributes force efficiently, and allows unrestricted operational airflow.

In one or more embodiments, an aquaponics system is disclosed which comprises a building housing an aquaculture facility tied to a grow floor. The grow floor is unique as it is terraced and/or spiraled. The grow floor in this configuration allows for grow beds for all kinds of different growing options and food production which can be utilized for year-round production in varying temperatures from a top of the building to the bottom of the building. The aquaponics system includes at least one pump which circulates water through the entire system which is intended to be powered by an off grid solar option or other green energy. The building is contemplated to be built 22' underground for strength and help with heating and cooling. In alternative embodiments, the building may be built at ground level.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
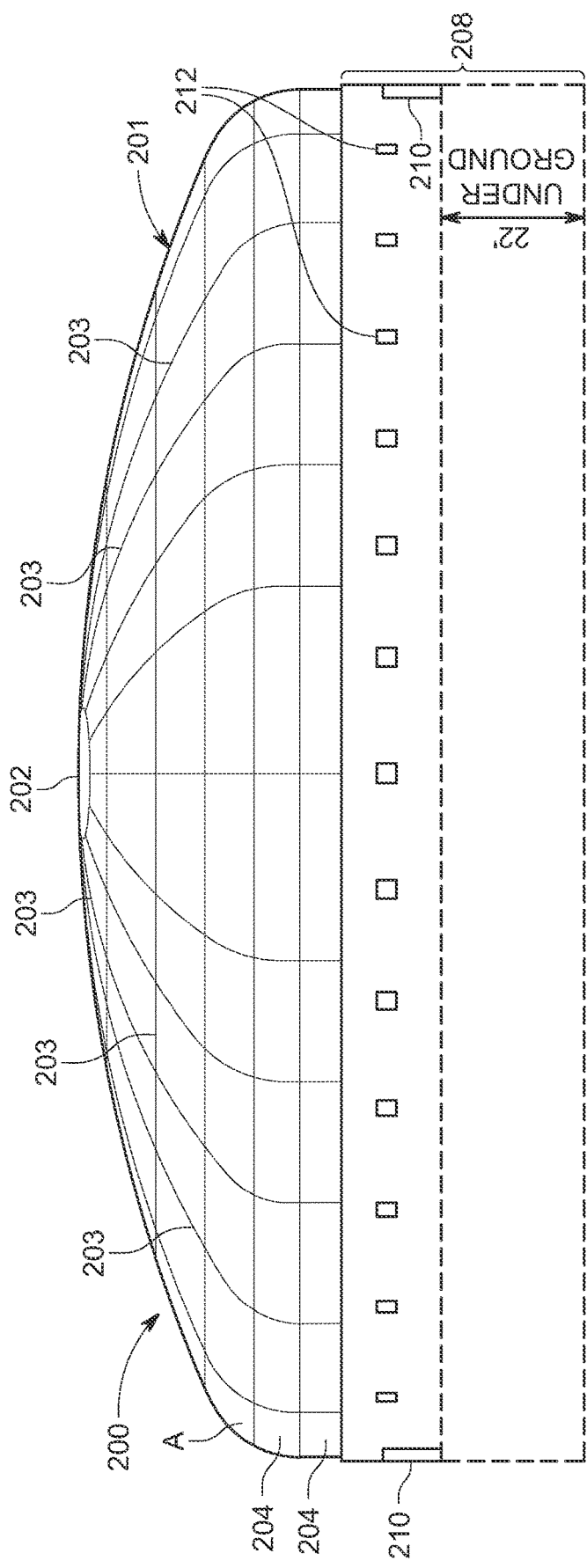
FIG. 1 is a pictorial illustration of an exterior view of an aquaponics grow farm system in accordance with an illustrative embodiment.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100 and includes both 25 and 100.

Referring now to the drawings and the following written description of the present invention, it will be readily understood by those persons skilled in the art that the present invention is susceptible to broad utility and application. Many embodiments and adaptations of the present invention other than those described herein, as well as many variations, modifications, and equivalent arrangements will be apparent from or reasonably suggested by the present invention and the detailed description thereof without departing from the substance or scope of the present invention. This disclosure is only illustrative and exemplary of the present invention and is made merely for purposes of providing a full and enabling disclosure of the invention.

The present disclosure is generally directed to one or more non-limiting embodiments of an aquaponics grow farm system, which will be referred to as an aquaponics system herein. The aquaponics system is conceived for rearing fish and growing plants using the current technologies known in the arts, but more efficiently and at a much large scale. However, the aquaponics system of the present disclosure can also be used in a small-scale setup. In broad terms, aquaculture and hydroponics technologies are combined to present a system that steers itself toward the future of farming by using green energy and relying as little as possible on climate polluting technologies. Further details are provided below with reference to the figures.

Figure 2:
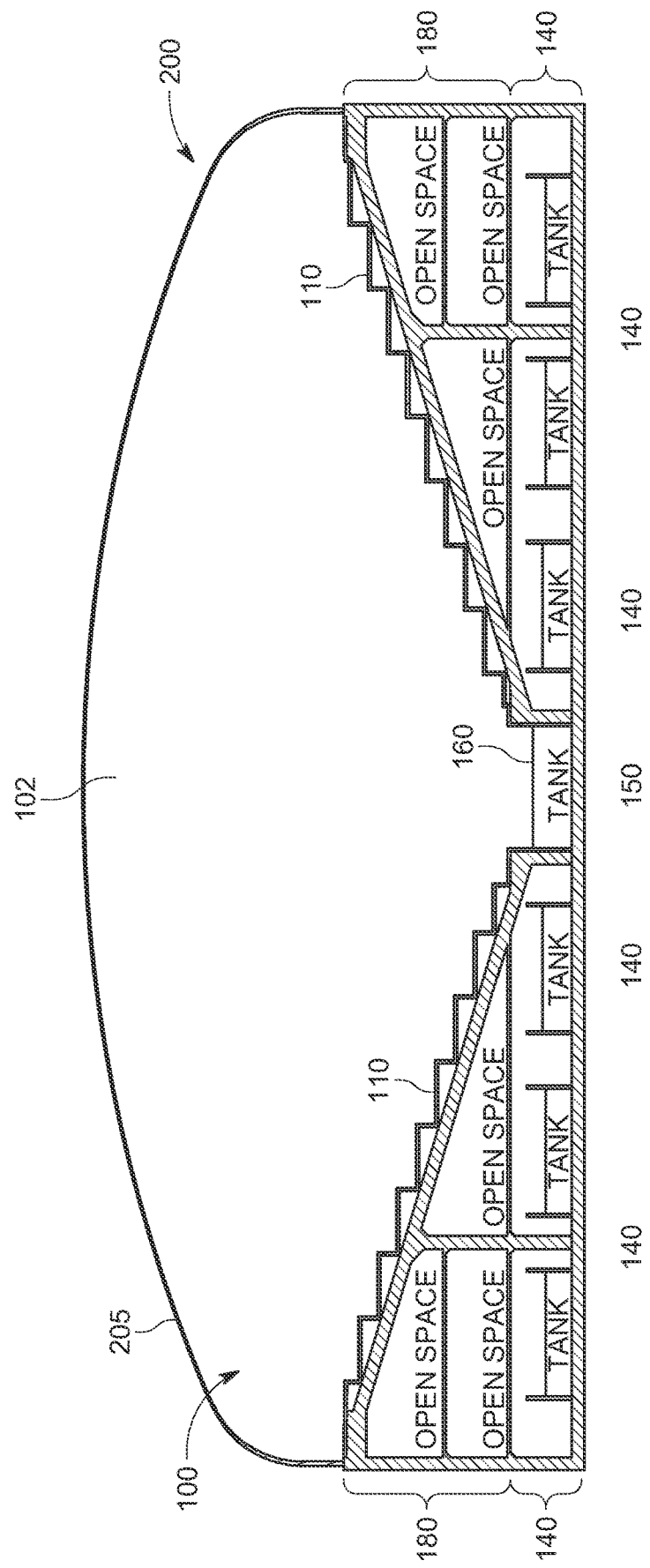
FIG. 2 is a pictorial illustration of a cross-sectional view taken along a vertical line of the aquaponics grow farm system from FIG. 1 in accordance with an illustrative embodiment.

Referring to the Figures, FIGS. 1 and 2 are illustrations of a non-limiting embodiment of an aquaponics system 100, which is an example of an aquaponics system that can be used to rear fish and grow plants/crops in a symbiotic relationship. The aquaponics system 100 described in this embodiment may be implemented at a large scale as a commercial aquaponics system to provide food for a community. It is also to be understood that the aquaponics system could be scaled down while retaining the key features of the system. FIG. 1 is an illustration depicting a side view of an exterior of the aquaponics system and FIG. 2 is a cross-sectional view of the aquaponics system 100 sectioned vertically down an approximate center of the aquaponics system 100. As seen in FIG. 1, the aquaponics system 100 is housed within a building 200 which includes a roof structure 201 and a bottom structure 208. The roof structure 201 may be a greenhouse type roof or a geodesic dome. The building 200 may be constructed for a large scale or commercial purpose having a height, width, and length that can accommodate such a venture. The bottom structure 208 of the building 200 includes a wall that extends from the roof 201 down to a ground, and further may extend underground several feet. An example depth may be in the range of 10 feet to 30 feet. The bottom structure 208 is ideally constructed with concrete and having steel reinforcements. Alternatives will be considered that are environmentally friendly and stronger. An example of a building 200 constructed to house an aquaponics system 100 for a large-scale commercial purpose may have an approximate width of 213 feet, a height of the aquaponics system at approximately 38 feet, and a building depth of approximately 22 feet.

The building 200 is shown to have a circular shape but it can be any geometric shape or size as long as a grow floor (see, grow floor 110 in FIG. 2 and FIG. 3) maintains a sloping downward spiral toward a centralized point. It is also to be understood that there could be multiple centralized points. The building 200 is ideally built to extend underground to provide strength to the building 200 and utilize geothermal properties to help with heating and cooling. Ideally, the building 200 is intended to have a smaller footprint than the amount of grow space that is configured inside of the building. The building 200 is expected to have one or more door openings 210 and multiple windows 212 to allow for natural light to enter an interior of the building 200. The roof structure 201 may have the characteristics to allow natural sunlight to be used so that artificial light will not be needed or will be used at a minimum. The roof structure 201 may also have sections that open and close for fresh air intake and for hot air to escape. The sections may open and close manually. The roof structure 201 may also include panels that can open at an angle to create a wind vortex to naturally strengthen the plants growing inside and to move air quickly.

As seen in FIGS. 1 and 2, the roof structure 201 may have a dome like shape that provides strength to the roof structure 201 than traditional hard angle roofs. In a preferred non-limiting embodiment, the roof structure 201 includes multiple arms 203 that are connected to a circular beam 202 at a center of the roof structure 201. The arms 203 may be fashioned from a hollow steel and are modeled as mast arms which start at a vertical for a few feet before starting on a curve inward toward the circular beam 202 at the center of the roof structure 201. An example may include the vertical portion of the mast arms at 5 to 7 feet before bending toward the circular beam 202. The vertical section panels 204, denoted as a section below the line A, will contain glass panels that will open at an angle to allow for natural air to enter. The curved section panels 205, denoted as a section above the line A, will include panels specifically made for covering greenhouses which offer insulation and light quality. An example of such a greenhouse covering panel is the Solexx™ greenhouse covering material. The curved section panels 205 are separate panels separated by the multiple arms 203 and individual channels spaced around the multiple arms 203. In this way, a single curved section panel 205 can be replaced if it is damaged instead of requiring a replacement of an entire area of the roof structure 201 covered with the curved section panels 205. It is to be understood that alternate dome structures can be used for the roof structure 201, such as and not limited to a geodesic dome structure with triangle steel beams. The covering material may include glass, polycarbonate, or other greenhouse covering material known in the arts.

An interior of the building 200 housing the aquaponics system 100 is shown as an example in the cross-sectional view in FIG. 2. The aquaponics system 100 is configured within the building and has multiple floor levels which includes the grow floor 110, an aquaculture production area 140, and an open space 180 between the grow floor 110 and the aquaculture production area 140. In this example of the aquaponics system 100, the aquaculture production area 140 is arranged at a ground floor level of the building 200, which is at the bottom most level of the building, which may be a portion under the ground. The aquaculture production area 140 contains tanks of varying sizes for fish production which produce fertilizer for plant cultivation. The open space 180 may be found on the levels between the grow floor 110 and the aquaculture tanks 140 ground floor level and thus the number of floors in this space will be dependent on the overall geometry of the building and the starting height of the grow floor 110. As seen in FIG. 2, the open space 180 is at two levels, which may be described as the second and third floor levels. As shown, the grow floor 110 is a terraced floor which extends from a top to a bottom of the building 200 and thus, the open space 180 on the second floor level is greater than the open space 180 on the third floor level. As the building 100 is anticipated to have a portion that extends underground, the aquaculture production area 140 being on the ground floor level will be in the underground level. Depending on the depth of the building 200, and using FIG. 2 as an example, the third floor may also be at a level that is underground. It is to be understood that the overall depth of the building 200 could be changed to be deeper or start at a natural ground level.

Figure 3:
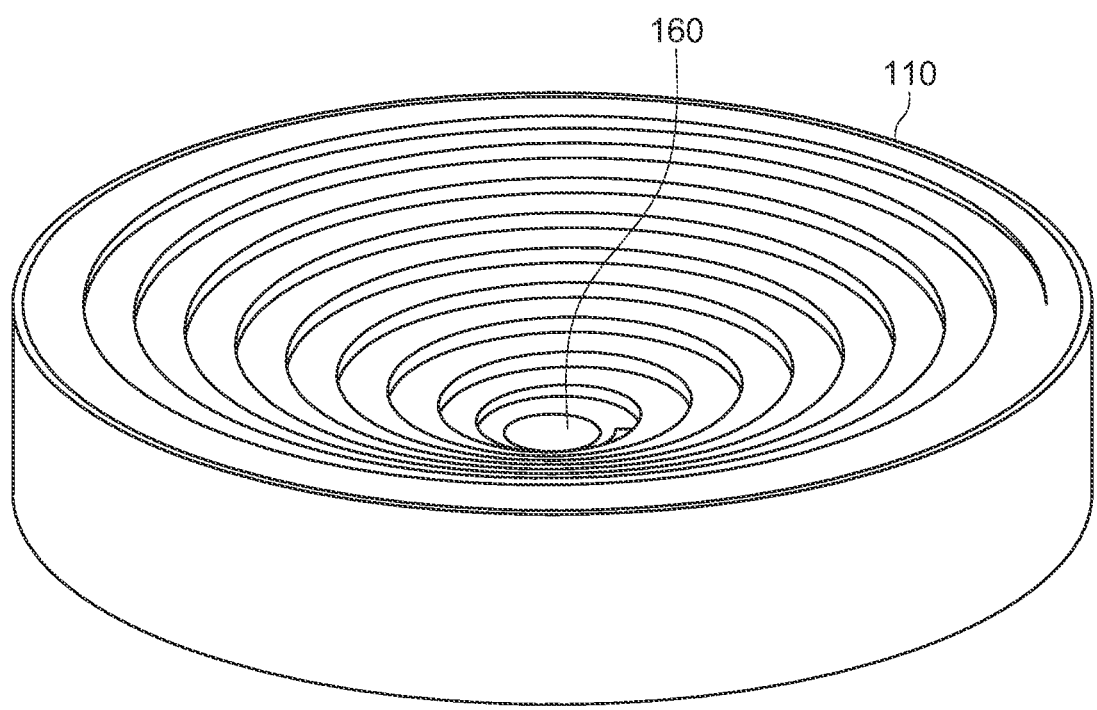
FIG. 3 is a pictorial illustration of a perspective view of a grow floor comprising part of the aquaponics grow farm system in accordance with an illustrative embodiment.

Referring to FIGS. 2 and 3, as mentioned above, the grow floor 110 is terraced, wherein the grow floor 110 is formed into a number of level areas resembling a series of steps. As shown, the grow floor 110 extends from a top of the bottom structure 208 to the bottom of the building 200 or a bottom of the bottom structure 208. FIG. 3 is an illustration of a perspective view of an example of a terraced grow floor 110. The illustration also depicts the spiral nature of the grow floor 110 which is intended to continuously spiral downward toward a bottom of the grow floor 110 which has a clean water tank 160 set at a relative center of the grow floor 110. In the illustrations, the grow floor 110 is shown to extend from the wall of the building 200, however the grow floor 110 may also be configured away from the wall leaving some space. It is also to be understood that the overall shape of the grow floor could be reconfigured as long as the function remains the same with the grow floor 110 maintaining a sloping spiral downward toward a collection point, or multiple collection points. In one non-limiting example, the grow floor 110 construction comprises a 10-foot-wide path starting at approximately 5 feet from an inner side of the bottom structure 208 gradually spiraling downward to the clean water tank 160 at the center of the grow floor 110, creating a 3-foot vertical terrace between the spirals. This will essentially create 3-foot-deep grow beds.

Figure 7:
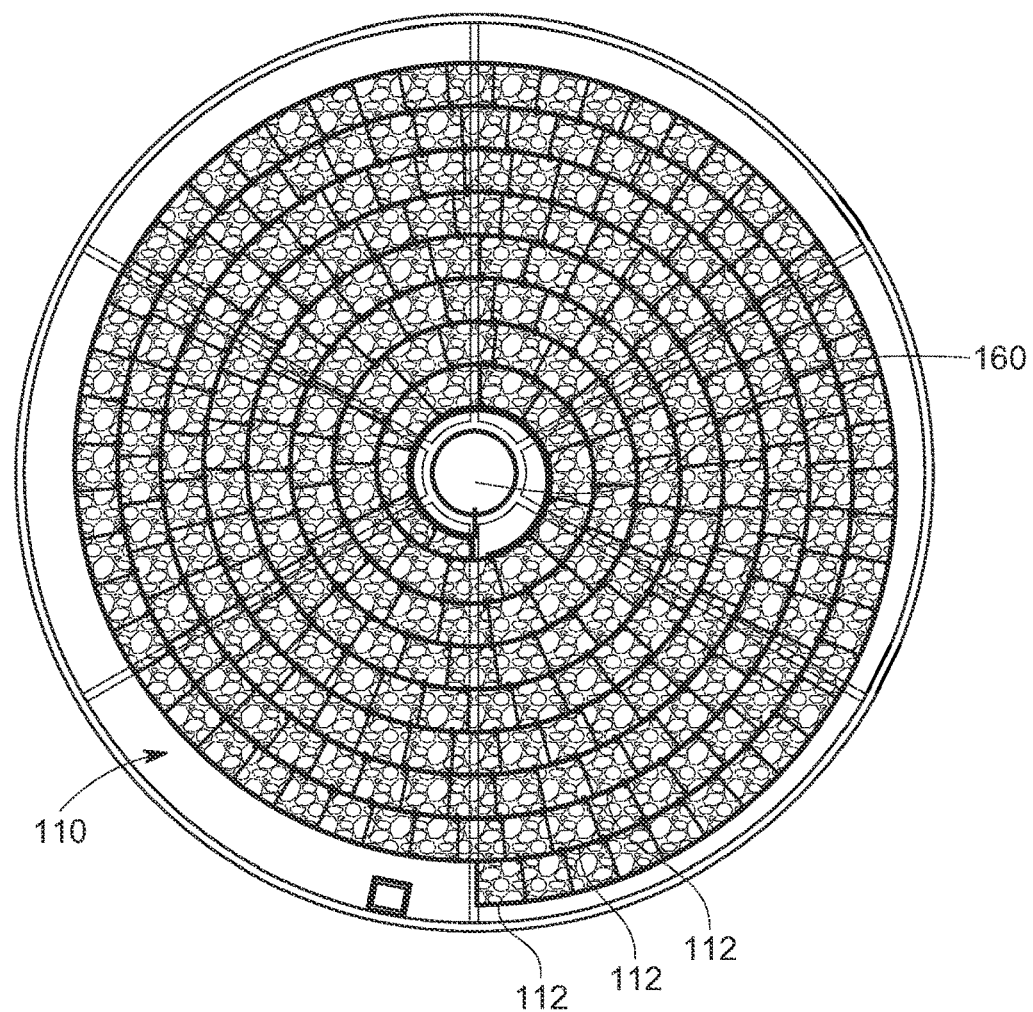
FIG. 7 is a pictorial illustration of a top view of an example setup for a grow floor in accordance with an illustrative embodiment.
Figure 8:
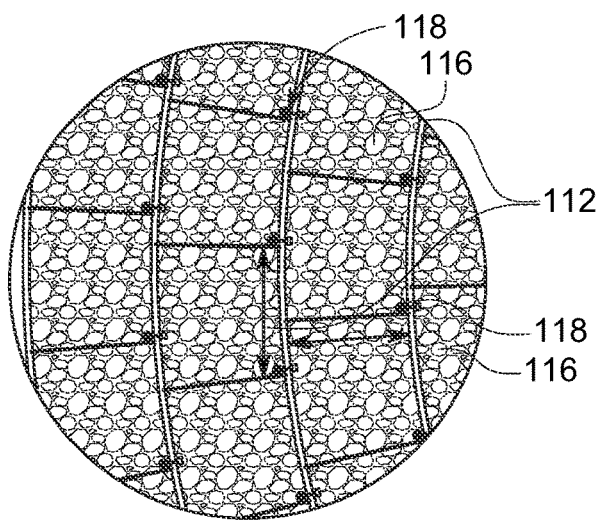
FIG. 8 is a pictorial illustration of a closeup view of a section of the alternative grow floor setup from FIG. 7 in accordance with an illustrative embodiment.
Figure 9:
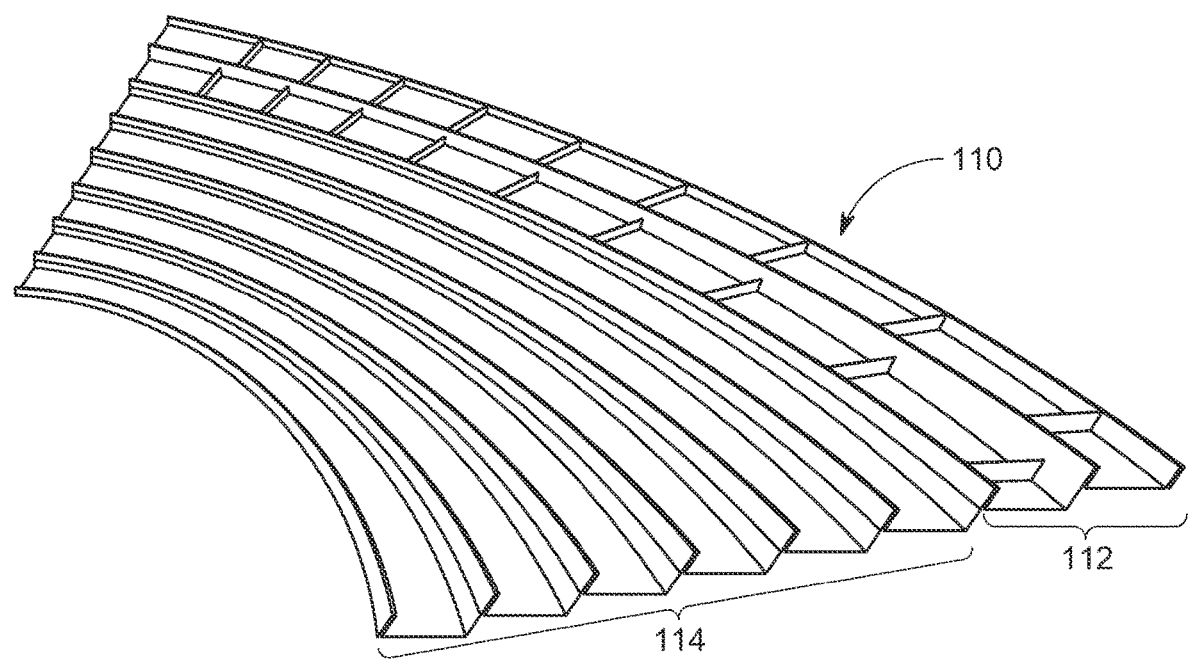
FIG. 9 is a pictorial illustration of another example of a setup for a grow floor in accordance with an illustrative embodiment.

A function of the grow floor 110 is to grow and produce plants within the walls of the building 200 and is contemplated to be in an area that is considered a sealed room 102. Thus, entry into the sealed grow room 102 and the grow floor 110 may require entering through a clean room. The grow floor 110 may be fashioned from concrete or other lasting material which will be coated in a food grade polyurethane waterproof coating. As the grow floor 110 is purposed to grow and produce plants, the grow floor 110 will contain grow beds, organized as desired. FIGS. 7 to 9 illustrate various options for grow beds, which are not meant to be limiting of the only options available, but illustrate a few examples that are possible. In FIG. 9, two grow bed options are depicted. One option includes a grow bed 114 that spans an entire length of a single spiral arm. Another option includes divided grow beds 112 that are basically sectioned off pods along an entire length of a spiral arm or a portion of the spiral arm. It is to be understood that dividers may be used to section off and make the divided grow beds 112. It is to be understood that any variation of grow beds can be accommodated on the grow floor 110 and a combination of grow beds may be used based on what is being grown and the need of the plants grown.

FIGS. 7 and 8 illustrate the divided grow beds 112 to show an example of how the grow floor 110 may be sectioned off with divided grow beds 112 and further illustrate an option of including grow medium 116 in the grow beds. It is contemplated that the grow beds 114 and divided grow beds 112 will allow for the aquaponics system 100 to grow field crops, wherein the grow beds 112, 114 may include grow medium 116 such as clay rocks, lava rocks, or the like. The depth of the grow medium can be lowered to allow for a type of deep-water culture, if desired. The grow beds 112, 114 may also include a method of moving water through the grow beds 112. In the constant spiral grow beds 114, the water is slowly moved downward via the pitch of the grow beds following the terraced and spiral grow floor 110. In the illustrations shown in FIGS. 7 and 8, the divided grow beds 112 may have bell siphons 118 for moving water between the divided grow beds 112 with flood and drain capability or can also maintain a constant water level by removing a cover of each of the bell siphons which maintains a constant water level for crops that prefer to grow in wet conditions (e.g., rice, wasabi, etc.). It is to be understood that other flood and drain methods or other constant water level maintaining methods may be used. Essentially, water will move through the grow beds 112 ending up in the clean water tank 160 at the center of the grow floor 110 to continue the cycle back through the fish tanks and so on.

As mentioned above, the grow floor 110 is constructed of concrete which also separates the clean grow room 102 from the floor below. Also mentioned above, the aquaculture production area 140 is configured at the ground level and thus the floors between the grow floor 110 and the aquaculture production area 140 comprise of the open space 180, which may be used for and configured for a variety of purposes. Some of the uses may include, and not be limited to, vertical farming, mushroom production, microgreens, plant nursery, office space, dry storage, cold storage, packaging and distribution, manufacturing, living area, sleeping area, bathroom(s), kitchen, mechanical room, electrical room, etc.

Figure 4:
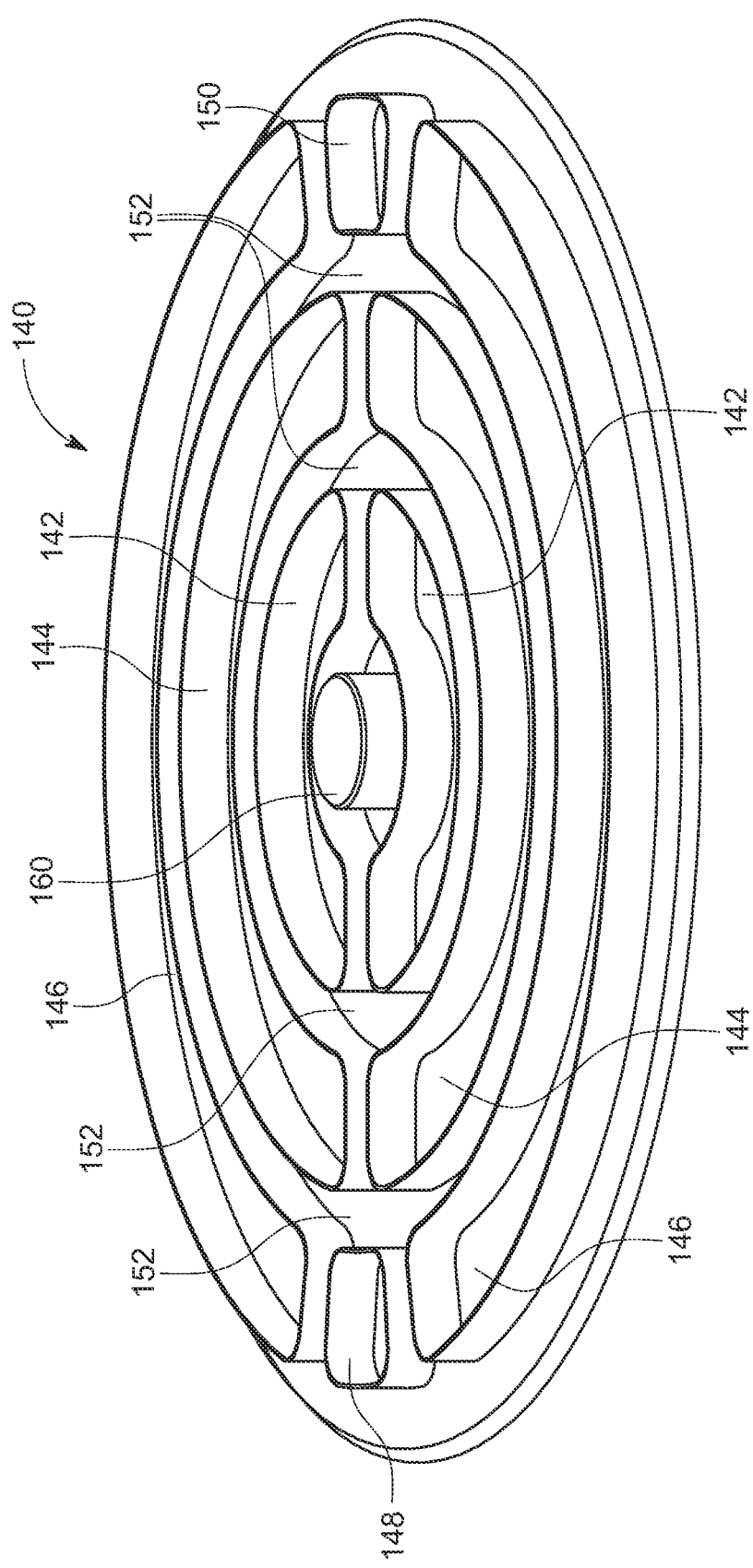
FIG. 4 is a pictorial illustration of a perspective view of an aquaculture production area comprising part of the aquaponics grow farm system in accordance with an illustrative embodiment.
Figure 5:
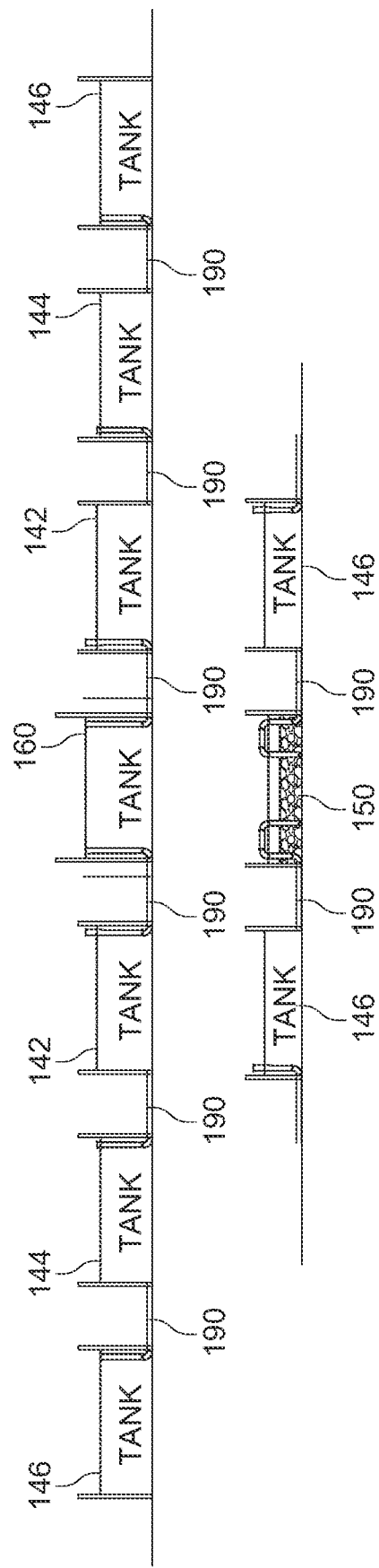
FIG. 5 is a pictorial illustration of a cross sectional view of several tanks and a connected piping structure comprising the aquaculture production area shown in FIG. 4 in accordance with an illustrative embodiment.

Refer to FIGS. 2, 4, and 5 for a depiction of an example setup of the aquaculture production area 140. As mentioned above, the aquaculture production area 140 is shown to be configured below ground level (best seen in FIG. 2). The aquaculture production area 140 is a fish rearing area and may include one or more fish breeding tanks 142, one or more juvenile fish tanks 144, and one or more adult fish tanks 146. The aquaculture production area 140 also incorporates one or more rainwater collection and overflow tanks 148, and one or more sludge and pump tank 150. Additionally, the aquaculture production area 140 may also include multiple walking paths 152 around the multiple tanks 142, 144, 146, 148, and 150. FIG. 4 best illustrates an example of how the multiple tanks 142, 144, 146, 148, and 150 may be arranged. It is to be understood that any arrangement of the tanks is contemplated within the disclosure of this invention as long as the function and/or purpose remains the same.

The one or more fish breeding tanks 142 may be arranged closest to the clean water tank 160, which is at the bottom of the terraced grow floor 110. The clean water tank 160 may collect the water from the grow beds 112, 114 configured on the grow floor 110 and distribute water back into the tank in the aquaculture production area 140. The clean water tank 160 may be used for growing food using floating mats as well as contain an electronic monitoring system for pH, nutrients, and other essentials. The clean water tank 160 is the only tank that may be exposed to sunlight entering from the roof structure 201 and/or the multiple windows 212.

The one or more fish breeding tanks 142 are housed adjacent to the clean water tank 160 as the fish breeding tanks 142 rear the younger fish or fry. The younger fish in the fish breeding tanks 142 require the cleanest water, and therefore their proximity to the clean water tank makes this arrangement efficient. The fish breeding tanks 142 will allow for the overproduction of fry to not only go through several development stages toward an adult fish but can also be used to feed the adult fish with from time to time. Thus, only the fry in the fish breeding tanks 142 need feed and the fry can be overproduced to sustain continuous fish development and used as feed for older fish. The fish breeding tanks 142 fill up with water from the clean water tank 160 to a certain depth, and water from the fish breeding tanks 142 may outfall into the one or more juvenile fish tanks 144.

The one or more juvenile fish tanks 144 receive water from the fish breeding tanks 142 and allow the juvenile fish to develop into reproductive mature adults. The juvenile fish tanks 144 are contemplated to have a larger volumetric capacity than the fish breeding tanks 142 to give the juvenile fish more room to develop. The juvenile fish tanks 144 also intake water to a certain depth after which the water outfalls into the one or more adult fish tanks 146.

The one or more adult fish tanks 146 receive overflow water from the juvenile fish tank 144 and the fish that have matured. Ideally, the fish will be separated into at least two tanks by male and female. Again, it is contemplated that the adult fish tanks will have a larger volumetric capacity than the juvenile fish tanks 144 as the fish are bigger, requiring more room to swim and keep them healthy. Keeping the male and female fish separate allows control over breeding, not only for maintaining fish numbers but also for ensuring that the healthiest fish are breeding to produce healthy offspring as the fish will also be consumed for food purposes. The adult fish may be fed fry from the fish breeding tank 142. The adult fish tanks 146 also intake water to a certain depth, and any overflow will outfall into the sludge and pump tank 150, which will also be referred to as the pump tank 150 for brevity.

Figure 6:
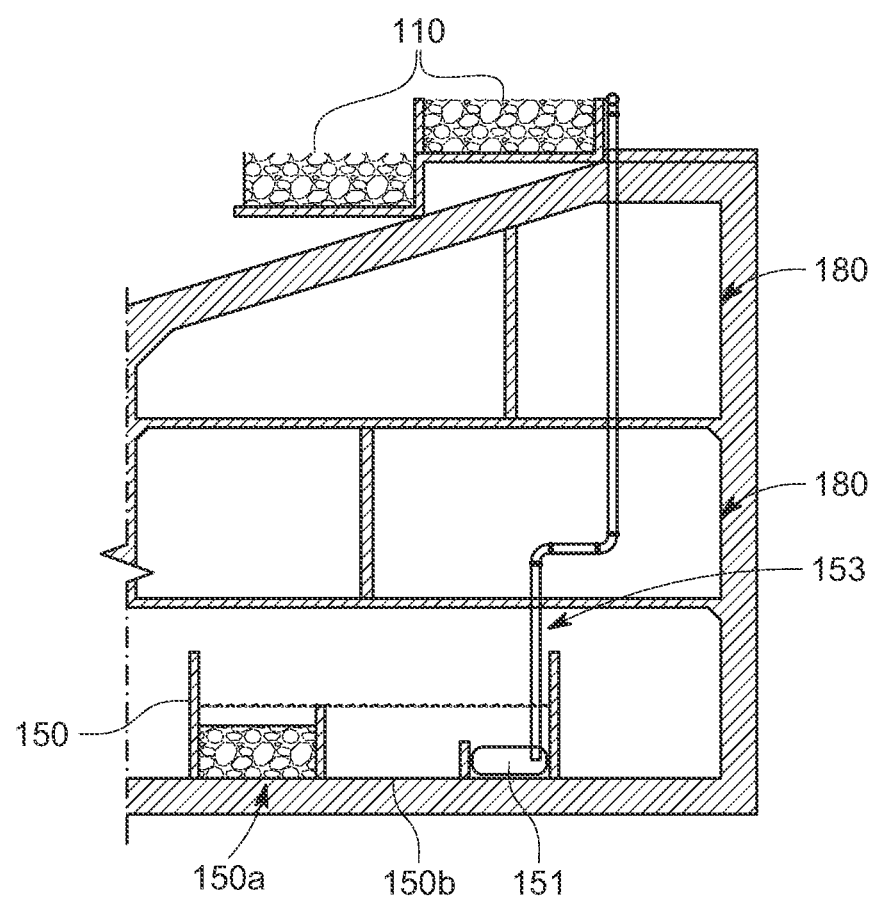
FIG. 6 is a pictorial illustration of a closeup cross-sectional view of the grow floor, and the aquaculture production area connected via a pipe in accordance with an illustrative embodiment.

The pump tank 150 is adjacent to the adult fish tanks 146 as the pump tank 150 receives the overflow water from the adult fish tanks 146. As best seen in FIG. 6, the pump tank 150 is contemplated to comprise of at least two tanks or a single tank which is divided into two sections. The two sections or two separate tanks may be purposed to have a first tank/section 150a filled with grow medium and a second tank/section 150b containing a pump 151 for pumping water out of the pump tank 150. The first tank/section 150a will have growth medium allowing for bacteria production and separation of solids. The water from the adult fish tanks 146 will be delivered to the first tank/section 150a to prepare the water for delivery to the plants on the grow floor 110. The water from the first tank/section 150a will outflow into the second tank/section 150b to be delivered to the grow floor 110 by the pump 151. FIG. 6 illustrates the pump 151 is operatively connected to a pipe 153 which is basically connected from the pump 151 to the grow floor 110 and essentially delivers water from the pump tank 150 to the grow floor 110.

The rainwater collection and overflow tank 148 is contemplated to receive water from a rainwater collection system which may be located at a top of the exterior of the building 200 and a base of the roof structure 201. Also, any water that is brought into the building 200 for the aquaponics system 100 will be delivered into the rainwater collection and overflow tank 148. The water in the rainwater collection and overflow tank 148 may be constantly tested before being introduced into the circulation. The testing of the water may be done electronically or manually. The water from the rainwater collection and overflow tank 148 may be delivered to the adult fish tanks 146.

FIG. 5 also illustrates the multiple gravity fed pipes 190 which deliver water from tank to tank. As shown, the gravity fed pipes 190 discharge from the bottom of the individual fish tanks 142, 144, 146, and outfall above a water line of the adjacent tank for aerations purposes. The gravity fed pipes will deliver water from a top of the clean water tank 160 to the fish breeding tank 142 to ensure that any solids settle to the bottom and the cleanest possible water is delivered to the younger fish/fry. Stated another way, the gravity fed pipe 190 from the clean water tank 160, at the center of the grow floor 110, will be at the surface of the clean water tank 160 to capture the cleanest water and allow for solids to accumulate at the bottom of the clean water tank 160. This allows regular cleaning of the clean water tank to remove the solids and maintain a steady pH. The gravity fed pipe 190 from the clean water tank 160 will outfall at a lower elevation into the fish breeding tank 142.

There are also several walking paths 152 arranged between the tanks 142, 144, 146, 148, 150, and 160. The walking paths 152 are for accessing the tanks. As best seen in FIG. 4, the walking paths 152 encircle each tank so that the tanks may be accessed from any side. It is to be understood that any other arrangement of the walking paths and tanks is also within the disclosure of the aquaponics system 100.

Essentially, the aquaculture production area 140 functions as a fish production area and provides fertilized water which is pumped to the grow floor 110 to feed and nourish a variety of plants in the grow beds 112, 114. The plants break down the nutrients from the fertilized water utilizing bacteria and thus, cleaning the water that is circulated back to the fish through the clean water tank 160. In a way, this is a continuous system that circulates the water throughout the multiple tanks and the grow floor, and the living elements of the system rely on each other. The plants rely on the fish for fertilizer and the fish rely on the plants to clean the water by breaking down the waste in the water which is then delivered back to the fish.

Accordingly, the present description provides for various embodiments for an aquaponics system 100 that can be used to combine the technologies of aquaponics and aquaculture in a more efficient and large-scale way. Many uses and advantages are offered by the device 100 as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. An aquaponics system comprising:
   an aquaculture production system comprising multiple fish tanks and water collection tanks, wherein the water collection tanks include one or more clean water tanks, one or more rainwater collection and overflow tanks, and/or one or more sludge and pump tanks;
   a grow floor having a terraced floor resembling a series of steps, wherein the grow floor has a continuous downward spiral toward a collection point, wherein the collection point receives water from the grow floor and delivers the water to the aquaculture production by a pipe; and
   wherein the aquaculture production system and the grow floor are arranged at varying floor levels within an enclosed building, wherein the grow floor extends from a top of the enclosed building in a terraced fashion toward a bottom of the enclosed building.

2. The aquaponics system of claim 1, wherein the enclosed building includes a roof structure and a bottom structure, wherein:
   the bottom structure extends underground and is defined as having one or more walls; and
   the roof structure includes multiple mast arms that are equally spaced, wherein the multiple mast arms extend vertically from the bottom structure before bending toward a center of the roof structure to connect with a circular beam.

3. The aquaponics system of claim 2, wherein the roof structure includes glass panels and/or greenhouse covering panels, wherein the glass panels and/or greenhouse covering panels open at an angle to allow for air movement.

4. The aquaponics system of claim 1, where an open space is created between the terraced grow floor and an area where the aquaculture production system is arranged, wherein an area of the open space is dependent on a starting height of the grow floor to the area of the aquaculture production system, wherein the open space is used for vertical farming, mushroom production, growing microgreens, plant nursery, office space, dry storage, cold storage, packaging and distribution, manufacturing, living area, sleeping area, bathroom(s), kitchen, mechanical room, and/or electrical room.

5. The aquaponics system of claim 1, wherein the aquaculture production system is arranged on a ground floor level.

6. The aquaponics system of claim 1, wherein the grow floor includes grow beds wherein the grow floor and grow beds together have a depth to accommodate grow medium and plants.

7. The aquaponics system of claim 6, wherein the water is moved through the grow beds in a downward spiral following a pitch of the grow floor starting at a top of the grow floor.

8. The aquaponics system of claim 1, wherein the aquaculture production system includes the one or more clean water tanks at the collection point, one or more fish breeding tanks, one or more juvenile fish tanks, and one or more adult fish tanks, wherein the water is distributed using pipes as such:
   the one or more fish breeding tanks receive the water from the one or more clean water tanks, the one or more juvenile fish tanks receive the water from the one or more fish breeding tanks, and the one or more adult fish tanks receive the water from the one or more juvenile fish tanks.

9. The aquaponics system of claim 8, wherein the water from the one or more adult fish tanks is distributed to one or more pump tanks which include a pump and where the water is supplemented with growth medium allowing for bacteria production and separation of solids, wherein the pump delivers the water to a top of the grow floor to circulate through one or more grow beds arranged on the grow floor, and wherein the water circulates into the one or more clean water tanks at a center of the grow floor, wherein,
   the one or more clean water tanks circulate the water into the one or more fish breeding tanks through a pipe capturing water from a top of the one or more clean water tanks and depositing the water at a bottom of the one or more fish breeding tanks.

10. The aquaponics system of claim 8, wherein the one or more rainwater collection and overflow tanks receive collected rainwater and water brought to the aquaponics system, wherein the collected rainwater and water from the one or more rainwater collection and overflow tanks is delivered to the one or more adult fish tanks.

11. An aquaponics system comprising:
    an aquaculture production system comprising multiple fish tanks for rearing fish;
    a grow floor configured as a terraced floor, resembling a series of steps, for growing plants and/or crops, wherein the grow floor has a continuous downward spiral toward one or more clean water tanks, wherein the one or more clean water tanks receive water from the grow floor and deliver the water to the aquaculture production system by a pipe, wherein the water circulates through the multiple fish tanks and a pump returns the water to the grow floor; and
    wherein the aquaculture production system and the grow floor are arranged within an enclosed building with the aquaculture production system arranged below the grow floor such that an open space is created between the aquaculture production system and the grow floor, and wherein the terraced grow floor extends from a top of the enclosed building in a terraced fashion toward a bottom of the enclosed building.

12. The aquaponics system of claim 11, wherein the enclosed building includes a roof structure and a bottom structure, wherein:
   the bottom structure extends underground and is defined as having one or more walls; and
   the roof structure includes multiple mast arms that are equally spaced, wherein the multiple mast arms extend vertically from the bottom structure before bending toward a center of the roof structure to connect with a circular beam.

13. The aquaponics system of claim 12, wherein the roof structure includes glass panels and greenhouse covering panels, wherein the glass panels open at an angle to allow for air movement.

14. The aquaponics system of claim 11, wherein an area of the open space is dependent on a starting height of the grow floor to a level where the aquaculture production system is arranged, wherein the open space is arranged into one or more floors dependent on the starting height of the grow floor, wherein the open space is used for vertical farming, mushroom production, growing microgreens, plant nursery, office space, dry storage, cold storage, packaging and distribution, manufacturing, living area, sleeping area, bathroom(s), kitchen, mechanical room, and/or electrical room.

15. The aquaponics system of claim 11, wherein the aquaculture production system is arranged on a ground floor level, wherein the ground floor level is at a bottom most level of the enclosed building.

16. The aquaponics system of claim 11, wherein the grow floor includes grow beds such that the grow floor and grow beds together have a depth to accommodate grow medium and plants.

17. The aquaponics system of claim 16, wherein the water is moved through the grow beds in a downward spiral following a pitch of the grow floor starting at a top of the grow floor.

18. The aquaponics system of claim 11, wherein the aquaculture production system includes the one or more clean water tanks, one or more fish breeding tanks, one or more juvenile fish tanks, and one or more adult fish tanks, wherein the water is distributed using pipes as such:
   the one or more fish breeding tanks receive the water from the one or more clean water tanks, the one or more juvenile fish tanks receive the water from the one or more fish breeding tanks, and the one or more adult fish tanks receive the water from the one or more juvenile fish tanks.

19. The aquaponics system of claim 18, wherein the water from the one or more adult fish tanks is distributed to one or more pump tanks which include a pump and where the water is supplemented with growth medium allowing for production of bacteria and separation of solids, wherein the pump delivers the water to a top of the grow floor to circulate through one or more grow beds arranged on the grow floor, and wherein the water circulates into the one or more clean water tanks at a center of the grow floor, wherein,
   the one or more clean water tanks circulate the water into the one or more fish breeding tanks through a pipe capturing the water from a top of the one ore more clean water tanks and depositing the water at a bottom of the one or more fish breeding tanks.

20. The aquaponics system of claim 18, wherein one or more rainwater collection and overflow tanks receive collected rainwater and water brought to the aquaponics system, wherein the collected rainwater and water from the one or more rainwater collection and overflow tanks is delivered to the one or more adult fish tanks.

* * * * *